United States Patent
Jana et al.

(10) Patent No.: US 11,939,490 B2
(45) Date of Patent: Mar. 26, 2024

(54) CURABLE SURFACE-PROTECTIVE COATING COMPOSITION, PROCESSES FOR ITS PREPARATION AND APPLICATION TO A METALLIC SUBSTRATE AND RESULTING COATED METALLIC SUBSTRATE

(71) Applicant: MOMENTIVE PERFORMANCE MATERIALS INC., Waterford, NY (US)

(72) Inventors: Rajkumar Jana, Bangalore (IN); Christoph Hilgers, Pulheim (DE); Indumathi Ramakrishnan, Bangalore (IN); Karthikeyan Murugesan, Bangalore (IN); Wibke Hartleb, Siegburg (DE)

(73) Assignee: MOMENTIVE PERFORMANCE MATERIALS INC., Waterford, NY (US)

( * ) Notice: Subject to any disclaimer, the term of this patent is extended or adjusted under 35 U.S.C. 154(b) by 879 days.

(21) Appl. No.: 16/634,780

(22) PCT Filed: Jul. 31, 2018

(86) PCT No.: PCT/US2018/044559
§ 371 (c)(1),
(2) Date: Jan. 28, 2020

(87) PCT Pub. No.: WO2019/027991
PCT Pub. Date: Feb. 7, 2019

(65) Prior Publication Data
US 2020/0207992 A1    Jul. 2, 2020

Related U.S. Application Data

(63) Continuation-in-part of application No. 15/664,023, filed on Jul. 31, 2017, now abandoned.

(30) Foreign Application Priority Data

Mar. 29, 2018    (EP) .................................... 18165148

(51) Int. Cl.
| B05D 3/02 | (2006.01) |
| C08G 77/18 | (2006.01) |
| C09D 5/08 | (2006.01) |
| C09D 183/06 | (2006.01) |
| C08K 3/22 | (2006.01) |
| C08K 3/36 | (2006.01) |
| C09D 4/00 | (2006.01) |

(52) U.S. Cl.
CPC ............ C09D 5/08 (2013.01); B05D 3/0254 (2013.01); C08G 77/18 (2013.01); C09D 183/06 (2013.01); *C08K 2003/2227* (2013.01); *C08K 3/36* (2013.01); *C09D 4/00* (2013.01)

(58) Field of Classification Search
CPC .............. C23C 18/122; C23C 18/1254; C23C 2222/20; C09D 183/04; C09D 183/06
USPC ......................................... 106/287.1–287.16
See application file for complete search history.

(56) References Cited

U.S. PATENT DOCUMENTS

| 4,450,255 | A | * | 5/1984 | Baney | .................. C09D 183/04 524/786 |
| 4,978,702 | A | | 12/1990 | Yuyama et al. | |
| 5,412,011 | A | | 5/1995 | Morris et al. | |
| 5,451,431 | A | | 9/1995 | Purnell et al. | |
| 5,766,680 | A | * | 6/1998 | Schmidt | .............. C23C 18/1254 427/226 |
| 6,695,904 | B2 | | 2/2004 | Burger et al. | |
| 7,727,635 | B2 | | 6/2010 | Furuya et al. | |
| 7,875,318 | B2 | | 1/2011 | Borovik et al. | |
| 8,361,627 | B2 | | 1/2013 | Hack et al. | |
| 8,372,515 | B2 | | 2/2013 | Byrne et al. | |
| 8,501,314 | B2 | | 8/2013 | Borovik et al. | |
| 8,609,755 | B2 | | 12/2013 | Su et al. | |
| 8,889,801 | B2 | | 11/2014 | Liao et al. | |
| 8,900,670 | B2 | | 12/2014 | Singh et al. | |
| 2001/0032568 | A1 | * | 10/2001 | Schutt | .................. C09D 183/14 106/287.15 |
| 2005/0244659 | A1 | * | 11/2005 | Higuchi | .................... C08J 7/046 428/447 |
| 2006/0099429 | A1 | * | 5/2006 | Domes | ..................... C09D 4/00 427/372.2 |
| 2007/0110906 | A1 | * | 5/2007 | Edelmann | ............... C09C 1/407 427/387 |
| 2008/0058489 | A1 | * | 3/2008 | Edelmann | ............. C09C 1/3081 528/9 |

(Continued)

FOREIGN PATENT DOCUMENTS

| CA | 2664664 A1 | 4/2008 |
| CN | 101805331 A | 8/2010 |

(Continued)

OTHER PUBLICATIONS

The Dorf Ketal Tyzor™ NPZ Product Brochure (Dorf Ketal Specialty Catalysts, LLC., https://www.dorfketal.com/including/PDF%20Files/d_sheets/DKLSC004_SC0019_Tyzor%20NPZ.pdf, 2011) (Year: 2011).*

(Continued)

*Primary Examiner* — Michael C Romanowski

(74) *Attorney, Agent, or Firm* — James C. Abruzzo

(57) ABSTRACT

A surface-protective coating forming composition exhibiting excellent shelf life (storage stability) and cured coating performance is derived from trialkoxysilane and metal oxide powder.

33 Claims, No Drawings

(56) References Cited

U.S. PATENT DOCUMENTS

| | | | | |
|---|---|---|---|---|
| 2011/0244244 A1* | 10/2011 | Nakatsukasa | ............ | G02B 1/14 524/766 |
| 2011/0268899 A1* | 11/2011 | Albert | .................. | C09D 183/08 428/447 |
| 2011/0293951 A1* | 12/2011 | Tsuchida | ................. | C23C 22/50 428/447 |
| 2012/0031302 A1 | 2/2012 | Albert et al. | | |
| 2012/0204762 A1* | 8/2012 | Albert | .................. | C09D 183/06 106/287.11 |
| 2014/0069293 A1 | 3/2014 | Albert et al. | | |

FOREIGN PATENT DOCUMENTS

| | | | | |
|---|---|---|---|---|
| EP | 2377902 | A1 | | 10/2011 |
| JP | 6295361 | A | | 5/1987 |
| JP | 08027422 | A | | 1/1996 |
| JP | 2001181572 | A | * | 7/2001 ............... C08K 3/11 |
| JP | 2013177683 | A | | 9/2013 |
| JP | 2003138211 | A | | 5/2014 |
| JP | 2015146528 | A | | 3/2015 |
| WO | WO 00/39177 | | * | 7/2000 |
| WO | 2008041976 | A2 | | 4/2008 |
| WO | 2010121872 | A1 | | 10/2010 |
| WO | 2010082566 | A1 | | 7/2012 |
| WO | 2013042278 | A1 | | 3/2013 |
| WO | 2014056552 | A1 | | 4/2014 |

OTHER PUBLICATIONS

International Search Report and Written Opinion dated Nov. 13, 2018.

Wang D et al: "Sol-gel coatings on metals for corrosion protection", Progress in Organic Coatings, Elsevier BV, NL, vol. 64, No. 4, Mar. 1, 2009 (Mar. 1, 2009), pp. 327-338.

Van Ooij W J et al: "Corrosion Protection Properties of Organofunctional Silanes—an Overview", Tsinghua Science and Technology, Tsinghua University Press, Beijing, CN, vol. 10, No. 6, Dec. 1, 2005 (Dec. 1, 2005), pp. 639-664.

* cited by examiner

CURABLE SURFACE-PROTECTIVE COATING COMPOSITION, PROCESSES FOR ITS PREPARATION AND APPLICATION TO A METALLIC SUBSTRATE AND RESULTING COATED METALLIC SUBSTRATE

CROSS-REFERENCE TO RELATED APPLICATIONS

The present application is a 371 of U.S. International Application No. PCT/US2018/044559, filed on Jul. 31, 2018, to which priority is claimed from U.S. patent application Ser. No. 15/664,023 tiled Jul. 31, 2017, and EP Patent Application No. 18165148.0 both of which are incorporated herein by reference in their entireties.

FIELD OF THE INVENTION

This invention relates to the field of surface-protective coating compositions, e.g., conversion and passivation coatings, and more particularly to curable coating compositions derived from alkoxysilanes and to processes for coating metallic substrates therewith.

BACKGROUND OF THE INVENTION

Numerous surface-protective coating compositions have been developed over the years for application to various kinds of surfaces for the purpose of conferring anticorrosion and/or anti-wear properties thereto. For example, chromium and heavy metal phosphate conversion coatings have been used to prepare metal surfaces prior to painting. However, growing concerns regarding the toxicity of chromium and the polluting effects of chromates, phosphates and other heavy metals discharged into streams, rivers and other waterways as industrial wastes have driven the quest for alternatives to such metal coating compositions.

One type of surface protective coating composition that has emerged from these efforts to develop non-chromium, non-phosphate and non-heavy metal based metal coating compositions is derived from alkoxysilanes. While curable coating compositions derived from alkoxysilanes continue to attract a high level of interest within the metals industry with some formulations having achieved wide-spread commercial acceptance, there remains considerable room for improvement in one or more of their properties that continue to be of major importance to metal fabricators and processors, e.g., the storage stability of the uncured compositions and the adhesion, flexibility, corrosion resistance, abrasion/wear resistance and optical clarity properties of the cured compositions.

SUMMARY OF THE INVENTION

In accordance with one aspect of the invention, there is provided a curable surface-protective coating forming composition for application to protect the surface of a substrate such as one of metal, metal alloy, metallized part, metal or metallized part possessing one or more protective layers, the coating forming composition comprising:

(i) at least one alkoxysilane selected from the group consisting of Formulas A and B:

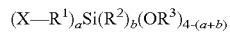  Formula A

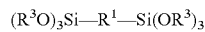  Formula B wherein:

X is an organofunctional group, more specifically a mercapto, acyloxy, glycidoxy, epoxy, epoxycyclohexyl, epoxycyclohexylethyl, hydroxy, episulfide, acrylate, methacrylate, ureido, thioureido, vinyl, allyl, —NHCOOR$^4$ or —NHCOSR$^4$ group in which R$^4$ is a monovalent hydrocarbyl group containing from 1 to about 12 carbon atoms, more specifically from 1 to about 8 carbon atoms, thiocarbamate, dithiocarbamate, ether, thioether, disulfide, trisulfide, tetrasulfide, pentasulfide, hexasulfide, polysulfide, xanthate, trithiocarbonate, dithiocarbonate or isocyanurato group, or another —Si(OR$^3$) group wherein R$^3$ is as hereinafter defined;

each R$^1$ is a linear, branched or cyclic divalent organic group of from 1 to about 12 carbon atoms, more specifically from 1 to about 10 carbon atoms, and most specifically from 1 to about 8 carbon atoms, e.g., a divalent hydrocarbon group such as the non-limiting examples of methylene, ethylene, propylene, isopropylene, butylene, isobutylene, cyclohexylene, arylene, aralkylene or alkarylene group, and optionally containing one or more heteroatoms such as the non-limiting examples of O, S and NR$^4$ in which R$^4$ is hydrogen or an alkyl group of from 1 to 4 carbon atoms;

each R$^2$ independently is alkyl, aryl, alkaryl or aralkyl group of from 1 to about 16 carbon atoms, more specifically from 1 to about 12 carbon atoms, and still more specifically from 1 to 4 carbon atoms, and optionally containing one or more halogen atoms, more specifically a fluorine atom;

each R$^3$ independently is an alkyl group of from 1 to about 12 carbon atoms, more specifically from 1 to about 8 carbon atoms and still more specifically from 1 to 4 carbon atoms;

subscript a is 0 or 1, subscript b is 0, 1 or 2 and a+b is 0, 1 or 2; and, the amount of alkoxysilane of Formula A when subscript a is 0 or 1, subscript b is 0, 1 or 2 and a+b is 2 is from 0 to about 8 weight percent of the coating forming composition, the amount of alkoxysilane of Formula A when a+b is 0 is from 0 to about 15 weight percent of the coating forming composition, the combined amounts of alkoxysilane of Formula A in which subscript a is 0 or 1, subscript b is 0 or 1 and a+b is 1 and of alkoxysilane of Formula B is from about 8 to about 40 weight percent, and the total amount of alkoxysilane of Formulas A and B does not exceed about 50, preferably about 45, more preferably about 40 weight percent of the coating forming composition;

(ii) at least one metal oxide in particulate form, the amount of metal oxide being from about 5 to about 50 weight percent of the coating forming composition;

(iii) at least one water miscible organic solvent;

(iv) at least one acid hydrolysis catalyst;

(v) water; and, (vi) optionally, at least one condensation catalyst, the coating forming composition having a viscosity at 25° C. within the range of from about 3.0 to about 7.0 cStks, more specifically from about 4.0 to about 5.5 cStks and still more specifically from about 4.5 to about 5.0 cStks.

In the present invention the viscosity is measured at 25° C. in accordance with the DIN 53015 standard, "Viscometry—Measurement of Viscosity by Means of the Rolling Ball Viscometer by Hoeppler" employing a Hoeppler Falling Ball Viscometer Model 356-001 equipped with a Haake DC10 temperature control unit and ball set 800-0182, in particular, ball no. 2 having a diameter of 15.598 mm, a weight of 4.4282 g and a density of 2.229 g/cm$^3$.

In an embodiment of the invention the at least one alkoxysilane (i) selected from the group consisting of Formulas A and B can be also hydrolyzed and condensed products thereof. Such products oligomers of the alkoxysilane (i) selected from the group consisting of Formulas A and B. and the like. They are prepared by hydrolysis and condensation of the alkoxysilanes (i) selected from the group consisting of Formulas A and B. That is, alkoxysilyl groups react with water, liberating the corresponding alcohol, and then the resulting hydroxysilyl groups condense with the formation of Si—O—Si (siloxane groups). The resulting hydrolysed and condensed products or oligomers can be for example linear or cyclic polysiloxanes comprising from 2 to 30 siloxy units, preferably from 2 to 10 siloxy units, and remaining alkoxy groups. It is to be understood that the provisos concerning the amounts of the alkoxysilanes (i), that is, the amount of alkoxysilane of Formula A when subscript a is 0 or 1, subscript b is 0, 1 or 2 and a+b is 2 is from 0 to about 25 weight percent of the coating forming composition, the amount of alkoxysilane of Formula A when a+b is 0 is from 0 to about 15 weight percent of the coating forming composition, the combined amounts of alkoxysilane of Formula A in which subscript a is 0 or 1, subscript b is 0 or 1 and a+b is 1 and of alkoxysilane of Formula B is from about 8 to about 40 weight percent of the coating forming composition, and the total amount of alkoxysilane of Formulas A and B does not exceed about 50, preferably about 45, more preferably about 40 weight percent of the coating forming composition, apply also for the corresponding oligomers which are derived from the alkoxysilane of Formulas A and B.

Specific preferred examples of such oligomers include in particular oligomeric glycidoxypropyl-trimethoxysilane.

Further in accordance with the present invention there is also provided a process for forming the foregoing curable surface-protective coating forming composition comprising:

a) chilling a mixture of alkoxysilane(s) (i) and a portion of acid hydrolysis catalyst (iv);

b) adding metal oxide (ii) and water (v) to the chilled mixture of step (a);

c) adding water-miscible organic solvent (iii) and the remainder of acid hydrolysis catalyst (iv) to the mixture resulting from step (b);

d) aging the mixture resulting from step (c) under conditions of elevated temperature and for a period of time effective to provide a curable coating forming composition having a viscosity at 25° C. within the range of from about 3.0 to about 7.0 cStks, more specifically from about 4.0 to about 5.5 cStks and still more specifically from about 4.5 to about 5.0 cStks; and, e) optionally, adding condensation catalyst (vi) at, during or following any of the preceding steps.

This process is particularly preferred when the metal oxide (ii) is a colloidal suspension of at least one metal oxide selected from the group consisting of silica, alumina, titania, ceria, tin oxide, zirconia, antimony oxide, indium oxide, iron oxide, titania doped with iron oxide and/or zirconia and rare earth oxide, or when the metal oxide (ii) is selected from a mixture of alumina and silica.

Further in accordance with another embodiment of the present invention there is also provided a process for forming the foregoing curable surface-protective coating forming composition which comprises:

a) chilling a mixture of the metal oxide (ii) and the acid hydrolysis catalyst (iv) preferably to a temperature of about −20° C. to about 15° C., preferably of about −10° C. to about 10° C., more preferably of about 0 to about 10° C., b) adding the alkoxysilane (i) (or a mixture thereof) to the chilled mixture of step (b);

c) allowing the mixture obtained in step c) to warm to room temperature (approximately 25° C.) (either preferably by letting it reach room temperature for example overnight or less preferred by supplying heat), d) adding the at least one water miscible organic solvent (iii), and optionally the condensation catalyst (vi) and optionally one or more other optional components (vii) to the mixture obtained in step d) to obtain a composition having a viscosity within the range of from about 3.0 to about 7.0 cStks at 25° C. This process is particularly preferred when the metal oxide (ii) is selected from silica modified with alumina. For example, a mixture of silica modified with alumina particles such as Levasil® 100S/45 (now: Levasil CS45-58P) (AkzoNobel) and Levasil® 200S/30 (now: Levasil CS30-516P) (AkzoNobel) and acetic acid (iv) is stirred in a flask. The mixture is cooled to 0-10° C. while the alkoxysilanes (i) are dropwise added within 20-50 min. The mixture is stirred while the solution is allowed to come to room temperature. On the next day, the solvents (iii) such as alcohols, the catalyst (vi) and the flow additive (vii) are added. The whole mixture is stirred for at least 15 min to obtain a coating forming composition.

According to yet another aspect of the invention, a metal possessing a surface-protective coating, i.e., a coating which imparts corrosion resistance and/or abrasion resistance to a surface of a non-coated or pre-coated metal, is obtained by the coating process which further comprises:

f) applying a coating of the foregoing coating forming composition to a non-coated or pre-coated surface of a metal;

g) removing at least some solvent (iii) from the applied coating of coating forming composition; and, h) curing the solvent-depleted coating of coating forming composition to provide a corrosion resistant and/or abrasion resistant coating on the metal surface.

Curable coating forming compositions of the invention possess excellent storage stability and cured surface-protective coatings obtained therefrom tend to exhibit one or more functionally advantageous properties such as high levels of corrosion and abrasion resistance, adherence to metal surfaces, flexibility (resistance to cracking or crazing caused by flexing of the metal) and acid and/or alkali resistance. In addition, the generally outstanding optical clarity of the cured coatings herein allows the aesthetically attractive quality of the underlying substrate surface to be shown to good effect.

DETAILED DESCRIPTION OF THE INVENTION

In the specification and claims herein, the following terms and expression are to be understood as having the hereinafter indicated meanings.

The singular forms "a," "an" and "the" include the plural, and reference to a particular numerical value includes at least that particular value unless the context clearly dictates otherwise.

Other than in the working examples or where otherwise indicated, all numbers expressing amounts of materials, reaction conditions, time durations, quantified properties of materials, and so forth, stated in the specification and claims are to be understood as being modified in all instances by the term "about".

All methods described herein may be performed in any suitable order unless otherwise indicated herein or otherwise clearly contradicted by context. The use of any and all examples or exemplary language (e.g., "such as") provided herein is intended merely to better illuminate the invention and does not pose a limitation on the scope of the invention unless otherwise claimed.

No language in the specification should be construed as indicating any non-claimed element as essential to the practice of the invention.

As used herein, the terms "comprising," "including," "containing," "characterized by" and grammatical equivalents thereof are inclusive or open-ended terms that do not exclude additional, unrecited elements or method steps, but will also be understood to include the more restrictive terms "consisting of" and "consisting essentially of."

Composition percentages are given in weight percent unless otherwise indicated.

It will be understood that any numerical range recited herein includes all sub-ranges within that range and any combination of the various endpoints of such ranges or sub-ranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The expression "coating forming composition" shall be understood to mean a composition, while not itself a practical or useful coating composition, following processing as described herein in detail forms a high quality and effective thermally curable surface-protective coating for application to a metal surface.

The term "metal" as used herein shall be understood herein to apply to metals per se, metal alloys, metalized parts and metal or metalized parts possessing one or more non-metallic protective layers.

By "hydrolytically condensed" is meant that one or more silanes in the coating composition-forming mixture are first hydrolyzed followed by the condensation reaction of hydrolyzed product with itself or with other hydrolyzed and/or unhydrolyzed components of the mixture.

A. Components of the Coating Forming Composition
Alkoxysilane (i)

Alkoxysilane (i) present in the coating forming composition can be one or more dialkoxysilane, trialkoxysilane and/or tetraalkoxysilane of Formula A and/or one or more trialkoxysilane of Formula B as described above provided at least one such trialkoxysilane is included therein.

Examples of dialkoxysilanes of Formula A include dimethyldimethoxysilane, diethyldiethoxysilane, diethyldimethoxysilane, 3-cyanopropylphenyldimethoxysilane, diphenyldimethoxysilane, Diphenyldiethoxysilane, di(p-tolyl)dimethoxysilane, bis(diethylamino)dimethoxysilane, bis(hexamethyleneamino)dimethoxysilane, Bis(trimethylsilylmethyl)dimethoxysilane, vinylphenyldiethoxysilane, and the like, and their mixtures.

As explained above the alkoxysilanes, including the dialkoxysilanes, also include hydrolysed and condensed products thereof (oligomers).

Examples of trialkoxysilanes of Formula A include methyltrimethoxysilane, methyltriethoxysilane, ethyltrimethoxysilane, ethyltriethoxysilane, ethyltripropoxysilane, n-propyltrimethoxysilane, n-propyltriethoxysilane, n-propyltripropoxysilane, n-propyltributoxysilane, n-butyltrimethoxysilane, isobutyltrimethoxysilane, n-pentyltrimethoxysilane, n-hexyltrimethoxysilane, isoocyltriethoxysilane, vinyltrimethoxysilane, vinyltriethoxysilane, phenyltrimethoxysilane, phenyltriethoxysilane, octyltrimethoxysilane, trifluoropropyltrimethoxysilane, 3-aminopropyltrimethoxysilane, 3-mercaptopropyltrimethoxysilane, 3-mercaptopropyltriethoxysilane, 3-glycidoxypropyltrimethoxysilane, 3-glycidoxypropyltriethoxysilane, oligomers and mixtures thereof. Of these, methyltrimethoxysilane, octyltrimethoxysilane and glycidoxypropyltrimethoxysilane are especially advantageous.

As explained above the alkoxysilanes, including the trialkoxysilanes, also include hydrolysed and condensed products thereof (oligomers).

Examples of tetraalkoxysilanes (i.e., tetraalkyl orthosilicates) of Formula A include tetramethoxysilane, dimethoxydiethoxysilane, tetraethoxysilane, methoxytriethoxysilane, tetrapropoxysilane, and the like, and their mixtures.

Examples of trialkoxysilanes of Formula B include 1,2-bis(trimethoxysilyl)ethane, 1,2-bis(triethoxysilyl)ethane, bis(trimethoxysilylpropyl)disulfide, bis(triethoxysilylpropyl)disulfide, bis(trimethoxysilylpropyl)tetrasulfide, bis(triethoxysilylpropyl)tetrasulfide, bis(3-triethoxysilylpropyl)amine, bis(3-trimethoxysilylpropyl)amine, and the like, and their mixtures.

Metal Oxide (ii)

Metal oxide component (ii) is generally provided in the form of particles, e.g., approximately spherical or equiaxial particles, ranging in average particle size from about 5 nm to about 500 nm, more specifically from about 10 to about 200 nm and still more specifically from about 10 to about 60 nm. The average particle sizes are determined in particular by Low Angle Laser Light Scattering (LALLS) using the full Mie theory, in particular, using Mastersizer 2000 or 3000, Malvern Instruments).

Metal oxide (ii) is advantageously provided as an aqueous colloidal dispersion thereof, for example, an aqueous colloidal dispersion of a metal oxide such as silica, alumina, titania, ceria, tin oxide, zirconia, antimony oxide, indium oxide, iron oxide, titania doped with iron oxide and/or zirconia, rare earth oxide, as well as mixtures and complex oxides thereof. Alternatively, metal oxides (ii) in powder form may be dispersed within the coating composition.

A preferred metal oxide (ii) is aqueous colloidal silica. Aqueous dispersions of colloidal silica which may advantageously be utilized in the present invention include those having an average particle size ranging from about 20 to about 150 nm and preferably from about 5 to about 30 nm. Such dispersions are known in the art, commercially available ones of which include, for example, Ludox® (Sigma Aldrich), Snowtex® (Nissan Chemical), and Bindzil® (AkzoNobel) and Nalco® Colloidal Silica (Nalco Chemical Company), Levasil® (AkzoNobel). Such dispersions are available in the form of acidic and basic hydrosols.

Both acidic and basic colloidal silica can be incorporated in the coating forming composition of the present invention. Colloidal silicas having a low alkali content may provide a more stable coating composition and may therefore be preferred. Particularly preferred colloidal silicas include Nalco® 1034A (Nalco Chemical Company) and Snowtex® O40, Snowtex® ST-033 and Snowtex® OL-40 (Nissan Chemical), Ludox® AS40 and Ludox® HS 40 (Sigma-Aldrich), Levasil® 200/30 and Levasil® 200 S/30 (now Levasil® CS30-516P) (AkzoNobel) and Cab-O-Sperse® A205 (Cabot Corporation).

If the metal oxide (ii) is as defined in the paragraphs [0025] to [0028], the total amount of alkoxysilane of Formulas A and B preferably does not exceed about 40 weight percent of the coating forming composition.

In an embodiment of the coating forming composition according to the invention the metal oxide (ii) is selected from a mixture of alumina and silica. Preferably for said mixture the weight ratio of alumina to silica ($Al_2O_3/SiO_2$) is from about 1:99 to about 99:1, preferably from about 5:95 to about 90:10, more preferably about 5:95 to about 75:25. Such mixtures are preferably prepared by admixing aqueous colloidal dispersions of alumina and silica. Using a mixture of alumina and silica provides for good adhesion to aluminum surface, very high abrasion resistance, good corrosion protection, heat resistance, and acid and alkali resistance.

In an embodiment of the coating forming composition according to the invention the metal oxide (ii) is selected from silica modified with alumina. In an embodiment, such silica modified with alumina may be silica the surface of which has been modified with alumina. Accordingly such silica modified with alumina is sometimes referred to as $Al_2O_3$—$SiO_2$—core-shell particles. Also, in this embodiment, the metal oxide (ii) may be advantageously provided as an aqueous colloidal dispersion. The use of such silica modified with alumina or $Al_2O_3$—$SiO_2$—core-shell particles is particularly helpful to protect anodized aluminum components on the exterior of automobiles, e.g. roof rails and trim parts and provides high corrosion resistance caused by high or low pH liquids, high scratch resistance and high heat resistance. The use of such silica modified with alumina in the coating forming composition according to the invention provides for high scratch resistance under long-term highly acidic environment conditions. Examples of silica modified with alumina include for example Levasil-types such as Levasil® 100S/45 (now: Levasil® CS45-58P) dispersion (45% in water) containing silica particles surface modified with $Al_2O_3$ having an average particle size of about 30 nm, and Levasil® 200S/30 (now: Levasil® CS30-516P) dispersion (30% in water) containing silica particles surface modified with $Al_2O_3$ having an average particle size of about 17 nm, and a surface area of about 85 $m^2/g$ (in Levasil® 100S/45) and about 160 $m^2/g$ (Levasil® 200S/30).

In a particular embodiment using silica modified with alumina, a mixture comprising at least two silicas modified with alumina having different average particle sizes may be used. For example, a mixture of two silicas modified with alumina having different average particle sizes may be used wherein the weight ratio of the silica modified with alumina having the smaller particle size (e.g. 10 to 25 nm) is higher than the amount of the silica modified with alumina having the bigger particle size (e.g. 26 to 40 nm), preferably the ratio small/big is about 10:1 to about 1:2, preferably about 10:1 to about 2:1. This measure provides for particularly high scratch resistances.

The amount of metal oxide(s) (ii) incorporated in the coating forming composition herein may in general vary from about 5 to about 50, more specifically from about 10 to about 40 and still more specifically from about 10 to about 30, weight percent based on the weight of the composition.

Water-Miscible Organic Solvent (iii)

Illustrative of water-miscible solvent(s) (iii) that may be incorporated in the coating forming composition of the invention are alcohols such as methanol, ethanol, propanol, isopropanol, n-butanol, tert-butanol, methoxypropanol, ethylene glycol, diethyleneglycol butyl ether, and combinations thereof. Other water-miscible organic solvents such as acetone, methyl ethyl ketone, ethylene glycol monopropyl ether and 2-butoxy ethanol can also be utilized. Typically, these solvents are used in combination with water, the latter together with any water associated with metal oxide (ii) and/or other component(s) of the coating composition providing part or all of water (v) thereof.

The total amount of water-miscible solvent(s) (iii) present in the coating forming composition can vary widely, e.g., from about 10 to about 80, more specifically from about 10 to about 65, more specifically from about 10 to about 60 and still more specifically from about 10 to about 50, weight percent based on the total weight thereof. When the coating forming composition comprises as the metal oxide (ii) silica modified with alumina, the total amount of water-miscible solvent(s) (iii) present in the coating forming composition can vary widely, e.g., from about 40 to about 70, more specifically from about 50 to about 65 weight percent based on the total weight thereof.

Acid Hydrolysis Catalyst (iv)

Any of the acidic hydrolysis catalysts heretofore employed for the hydrolysis of alkoxysilanes can be incorporated in the coating forming composition herein. Illustrative acid hydrolysis catalysts (iv) include sulfuric acid, hydrochloric acid, acetic acid, propanoic acid, 2-methyl propanoic acid, butanoic acid, pentanoic acid (valeric acid), hexanoic acid (caproic acid), 2-ethylhexanoic acid, heptanoic acid (enanthic acid), octanoic acid (caprylic acid), oleic acid, linoleic acid, linolenic acid, cyclohexanecarboxylic acid, cyclohexylacetic acid, cyclohexenecarboxylic acid, benzoic acid, benzeneacetic acid, propanedioic acid (malonic acid), butanedioic acid (succinic acid), hexanedioic acid (adipic acid), 2-butenedioic acid (maleic acid), lauric acid, stearic acid, myristic acid, palmitic acid, isoanoic acid, versatic acid, lauric acid, stearic acid, myristic acid, palmitic acid, isoanoic acid, aminoacids and mixtures thereof. The acid hydrolysis catalyst can be used undiluted or in the form of an aqueous solution.

Acid hydrolysis catalyst (iv) will be present in the coating forming composition of the invention in at least a catalytically effective amount which in most cases can range from about 0.1 to about 5, more specifically from about 0.5 to about 4.5, and more specifically from about 2 to about 4, weight percent based on the total weight of coating forming composition. In certain embodiments, e.g., when the coating forming composition comprises as the metal oxide (ii) silica modified with alumina, the amount of the acid hydrolysis catalyst (iv) can also range from about 0.1 to about 2 weight percent based on the total weight of coating forming composition.

Water (v)

The water component of the coating forming composition herein is advantageously deionized (DI) water. Some or even all of the total water present in the coating composition-forming mixture may be added as part of one or more other components of the mixture, e.g., aqueous colloidal dispersion of metal oxide (ii), water-miscible solvent (iii), acid hydrolysis catalyst (iv) optional condensation catalyst (vi) and/or other optional components (vii) such as those hereinafter described.

The total amount of water (v) can range within widely varying limits, e.g., from about 5 to about 40, more specifically from about 5 to about 30 and still more specifically from about 5 to about 15, weight percent based on the total weight of coating forming composition.

Optional Condensation Catalyst (vi)

Optional condensation catalyst (vi) catalyzes the condensation of partially or completely hydrolyzed silane components (a) and (b) of the coating forming composition herein and thus functions as a cure catalyst.

While the coating forming composition can be cured in the absence of optional condensation catalyst (vi), efficient curing may require more intensive conditions, e.g., the application of elevated temperature (thermal curing) and/or extended cure times, both of which may be undesirable from a cost and/or productivity standpoint. In addition to providing for a more economical coating process, the use of optional condensation catalyst (vi) generally results in improved shelf life of the coating forming composition.

Illustrative of condensation catalysts (vi) that may optionally be present in the coating forming composition herein are tetrabutylammonium carboxylates of the formula $[(C_4H_9)_4N]^+[OC(O)-R^5]^-$ in which $R^5$ is selected from the group consisting of hydrogen, alkyl groups containing from 1 to about 8 carbon atoms, and aromatic groups containing about 6 to about 20 carbon atoms. In preferred embodiments, $R^5$ is a group containing about 1 to 4 carbon atoms, such as methyl, ethyl, propyl, isopropyl, butyl or isobutyl. Compared to more active types of condensation catalysts (v), e.g., mineral acids and alkali metal hydroxides, the foregoing tetrabutylammonium carboxylates being somewhat milder in their catalytic action tend to optimize the shelf life of the coating forming compositions containing them. Exemplary tetrabutylammonium carboxylate condensation catalysts of the foregoing formula are tetra-n-butylammonium acetate (TBAA), tetrabutylammonium formate, tetra-n-butylammonium benzoate, tetra-n-butylammonium-2-ethylhexanoate, tetra-n-butylammonium-p-ethylbenzoate and tetra-n-butylammonium propionate. In terms of effectiveness and suitability for the present invention, the preferred condensation catalysts are tetrabutylammonium carboxylate, tetra-n-butylammonium acetate (TBAA), tetra-n-butylammonium formate, tetra-n-butylammonium benzoate, tetra-n-butylammonium-2-ethylhexanoate, tetra-n-butylammonium-p-ethylbenzoate, and tetra-n-butylammonium propionate, tetramethylammonium acetate, tetramethylammonium benzoate, tetrahexylammonium acetate, dimethylanilium formate, dimethylammonium acetate, tetramethylammonium carboxylate, tetramethylammonium-2-ethylhexanoate, benzyltrimethylammonium acetate, tetraethylammonium acetate, tetraisopropylammonium acetate, triethanol-methylammonium acetate, diethanoldimethylammonium acetate, monoethanoltrimethylammonium acetate, ethyltriphenylphosphonium acetate, TBD acetate (1,5,7-Triazabicyclo[4.4.0]dec-5-ene (TBD)), as well as combinations of two or more thereof.

Of the foregoing tetrabutylammonium carboxylate condensation catalysts, tetra-n-butylammonium acetate and tetra-n-butylammonium formate are generally preferred with tetra-n-butylammonium acetate being more preferred.

Where utilized, condensation catalyst (vi) can be present in the coating forming composition herein in at least a catalytically effective amount, e.g., from about 0.0001 to about 1 weight percent based on the total weight thereof.

Other Optional Components (vii)

One or more other optional components (vii) are suitable for inclusion in the coating forming composition herein.

For example, the coating forming composition can also include one or more surfactants functioning as leveling agents or flow additives. Examples of suitable surfactants include fluorinated surfactants such as Fluorad® (3M), silicone polyethers such as Silwet® and CoatOSil® (Momentive Performance Materials, Inc.) and silicone surface additives such as polyether-modified silicones, such as BYK-302 (BYK Chemie USA). The coating composition herein composition can also include a UV absorber such as benzotriazole, benzophenones, dibenzylresorcinol. Preferred UV absorbers are those capable of co-condensing with silanes, specific examples of which include 4-[gamma-(trimethoxysilyl) propoxyl]-2-hydroxy benzophenone, 4-[gamma-(triethoxysilyl) propoxyl]-2-hydroxy benzophenone and 4,6-dibenzoyl-2-(3-triethoxysilylpropyl) resorcinol. When the preferred UV absorbers that are capable of co-condensing with silanes are used, it is important that the UV absorber co-condenses with other reacting species by thoroughly mixing the thermally curable coating composition herein before applying it to the surface of a metal. Co-condensing the UV absorber prevents coating performance loss that may be caused by the leaching of free UV absorbers to the environment during weathering.

The coating forming composition herein can also include one or more antioxidants such as a hindered phenol (e.g. Irganox® 1010 (Ciba Specialty Chemicals), dyes such as methylene green, methylene blue, and the like), fillers such as Titanium dioxide, zinc phosphate, barytes, aluminium flakes, etc. and plasticizer such as dibutylpthalate.

B. Formation of the Coating Forming Composition.

In the formation of the thermally curable coating composition of the invention, chilling a mixture of alkoxysilane(s) (i) and a portion of the acid hydrolysis catalyst (iv), subsequent addition of the remaining portion of acid hydrolysis catalyst (iv) and aging of the resulting mixture under predetermined conditions of elevated temperature and time leads to a thermally curable composition having a range of viscosity of from about 3.0 to about 7.0 cStks, in another embodiment more specifically from about 4.0 to about 5.5 cStks and still in another embodiment more specifically from about 4.5 to about 5.0 cStks.

Chilling can be done for example by using an ice bath, ice/NaCl mixture or dry ice/isopropanol mixture. More specifically the alkoxysilanes (i) and the acid hydrolysis catalyst (iv) are placed in a glass bottle and then placed in an ice bath to chill the mixture while monitoring temperature through an external thermometer. Chilling the mixture of the alkoxysilanes (i) and the acid hydrolysis catalyst (iv) is preferably done to a temperature of about −20° C. to about 15° C., preferably of about −10° C. to about 10° C., more preferably of about 0 to about 10° C.

In a first stage of the process of forming the thermally curable coating composition herein, a mixture of trialkoxysilane of Formulas A and/or B, optional dialkoxysilane and/or tetraalkoxysilane of Formula A and from about 10 to about 40 percent of the total amount of acid hydrolysis catalyst (iv) is chilled to within a range of temperature of from about −20° C. to about 15° C., and preferably from about −10° C. to about 10° C. While in the chilled condition, metal oxide (ii), e.g., aqueous colloidal silica, is slowly added to the mixture.

Following the addition of metal oxide (ii) and with constant stirring over a period of from about 2 to about 10, and more specifically from about 5 to about 8, days, the chilled mixture is allowed to rise in temperature to or about ambient, e.g., from about 20° C. to about 30° C. During this period of continuous stirring, the alkoxysilane component(s) (i) of the mixture undergo an initial level of hydrolysis followed by condensation of the resulting hydrolyzates.

When the metal oxide (ii) is selected from silica modified with alumina it is preferred to chill these formulations for some hours/overnight, e.g. for about 2 to about 10 hours.

In a second stage of the process for forming the thermally curable coating composition herein, water-miscible solvent(s) (iii) and the remaining acid hydrolysis catalyst (iv) are added to the now ambient temperature reaction medium and under continuous stirring over a period of, e.g., from about 5 to about 24, and more specifically from about 8 to about 15, hours during which further hydrolysis of silanes and/or partial hydrolyzates and condensation of the thus-formed hydrolyzates thereof takes place.

When the metal oxide (ii) is selected from silica modified with alumina it is preferred to add the whole amount of the acid hydrolysis catalyst (iv) directly in the beginning, so there is no addition of the acid hydrolysis catalyst (iv) at this point.

The addition of part of acid hydrolysis catalyst (iv) in the first stage and the addition of the remaining acid hydrolysis catalyst (iv) in the second stage results in a curable coating composition within the aforestated range of viscosity. Hydrolysis and condensation reaction rates are dependent on the concentration of acid hydrolysis catalyst (iv) and on the pH of the reaction mixture. Final pH of the reaction mixture is advantageously maintained from about 2 to about 7, and more specifically from about 4 to about 6. Acid hydrolysis catalyst (iv) is added in two stages in order to maintain the pH in each stage. The initial portion of acid hydrolysis catalyst (iv) is added in such a way, e.g., dropwise, as to prevent agglomeration and precipitation of metal oxide particulate (ii) thereby allowing the alkoxysilane component(s) (i) to undergo hydrolysis and functionalize metal oxide particles (ii). With the silanization of metal oxide particulates (ii), the pH of the mixture will reach almost neutral.

When the metal oxide (ii) is selected from silica modified with alumina usually pH ranges of about 3 to about 4 such as about 3.5 to about 3.8 are achieved with no additional pH adjustment.

Acid hydrolysis catalyst (iv) may be added at the second stage to maintain the final pH of the mixture so that the condensation of silanol is controlled and gel formation is inhibited thereby providing relatively long shelf life, e.g., a coating forming composition containing less than about 5, preferably less than about 2 and more preferably less than about 1, weight percent gel of the total weight thereof after storage under ambient temperature of not less than about 15 days, more specifically not less than about 20 days and still more specifically not less than about 30 days. In certain embodiments storage at temperatures in the range of about 0 to about 15° C. preferably at about 5 to about 10° C. might be appropriate, If utilized, optional condensation catalyst (vi) may be added in at least a catalytically effective amount at, during or following any of steps (a)-(d) of preparing the curable coating composition. The amounts of optional condensation catalyst (v) can vary widely, e.g., from about 0.01 to about 0.5, and more specifically from about 0.05 to about 0.2, weight percent based on the total weight of coating forming composition.

The optimum amount of residual silanol is obtained by accelerating the condensation reaction during aging as more fully described below. Once the desired viscosity level is obtained, the curable coating composition can be applied to a desired substrate to produce a uniform, transparent and hard coating thereon (steel wool abrasion resistance test with 1 kg load as described in Table 5 below.

Following this additional period of hydrolysis, optional condensation catalyst (v) and one or more other optional components (vii) may be added to the reaction mixture, advantageously under continuous stirring for a further period of time, e.g., for from about 1 to about 24 hours. The resulting reaction mixture is now ready for aging.

Aging of the foregoing coating composition-forming mixture is carried out at elevated temperature over a period of time which has been experimentally determined to result in a viscosity within the aforestated range of from about 3.0 to about 7.0 cStks.

When the metal oxide (ii) is selected from silica modified with alumina aging is normally not required.

Achieving such viscosity results in a curable coating composition with good-to-excellent cured coating properties. A lower viscosity may lead to reduced hardness of the coating film and to post curing that may occur on continued exposure of the coating. A higher viscosity may lead to cracking of the coating film during curing and subsequent exposure conditions.

For many coating composition-forming mixtures, a viscosity within the range of from about 3.0 to about 7.0 cStks can be achieved by heating the coating-forming mixture in an air oven, e.g., to a temperature of from about 25 to about 100° C. for from about 30 min. to about 1 day, more specifically at a temperature of from about 25 to about 75° C. for from about 30 min. to about 5 days and still more specifically at a temperature from about 25 to about 50° C. for from about 3 to about 10 days. The hydroxyl-containing hydrolyzable silane is partially hydrolyzed when less than an equivalent amount of water reacts with the hydrolyzable silyl group. The silane is considered partially hydrolyzed when the percent hydrolysis is in the range of about 1 to about 94 percent. The hydroxyl-containing hydrolyzable silane is considered substantially fully hydrolyzed when the percent hydrolysis is in the range of from about 95 to about 100 percent. The partially hydrolyzed hydroxyl-containing hydrolyzable silane has better stability in an aqueous solution because the $R^1O$—Si group terminates the polymerization reaction of the silanol condensation and maintains a lower average molecular weight oligomeric composition that is derived from the hydroxyl-containing hydrolyzable silane. The lower average molecular weight oligomeric composition adsorbs more uniformly onto the metal substrate resulting in better adhesion.

C. Coating Application and Curing Procedures

The coating forming composition of the invention, with or without the further addition of added solvent(s), will typically have a solids content of from about 10 to about 50, more specifically from about 15 to about 40 and still more specifically from about 20 to about 30, weight percent. The pH of the coating composition will often come within the range of from about 3 to about 7, and more specifically from about 4 to about 6.

When the metal oxide (ii) is selected from silica modified with alumina the pH of the coating composition will often come within the range of from about 3 to about 4 such as about 3.5 to about 3.8.

The curable coating composition can be coated onto a metal substrate with or without the use of a primer and preferably without a primer.

Suitable metals include steel, stainless steel, aluminum, anodized aluminum, magnesium, copper, bronze, alloys of each of these metals, and the like, with anodized aluminum being a particularly desirable substrate due to its inherent corrosion resistance property and strength to weight ratio.

The coating forming composition can be applied to a metal surface or other substrate employing any conventional or otherwise known technique such as spraying, brushing and flow coating. Also dip-coating is possible. Wet, i.e., freshly applied, coating thicknesses can be made to vary over a fairly broad range, e.g., from about 10 to about 150, more specifically from about 20 to about 100, and still more specifically from about 40 to about 80, microns. As-applied coatings of such thicknesses upon drying will generally provide cured coatings having thicknesses ranging respectively from about 3 to 30, more specifically from about 5 to about 20 and still more specifically, from about 10 to about 15, microns.

When the metal oxide (ii) is selected from silica modified with alumina typically dry coating thicknesses (DFT) of about 2 to about 10 microns, preferably about 3 to about 7 microns are adjusted.

As the coating dries, solvent(s) (iii) and any other readily volatile material(s) will evaporate and within a brief elapse of time, e.g., 15-30 minutes or so, the applied coating will have become tack free to the touch whereupon the coating layer/film can be considered ready for curing advantageously employing conventional or otherwise known thermal curing procedures the operational requirements of which are well known in the art. For example, thermally accelerated curing may be carried out within a temperature regime of from about 80 to about 200° C. over a period of from about 30 to about 90 minutes to provide a cured, optically clear, hard protective coating on the substrate metal.

The cured coating obtained from the coating forming composition of the invention may be in direct contact with the metal surface, may serve as the sole coating therein, may be superimposed upon one or more other coatings and/or may itself possess one or more other coatings superimposed thereon. The cured coating composition, in addition to imparting corrosion and/or abrasion resistance properties to its metal substrate may also function as an aesthetic coating in which case it will constitute the sole or outermost coating on the metal substrate.

The advantages of the coating forming composition of the invention over known alkoxy silane-based coating forming compositions lie not only in the exceptional storage stability of the former, attributable it is believed to the particular combination of starting components and their amounts and to the unique process by which the coating forming composition is obtained, in particular, its separate cooling, split-addition of hydrolysis catalyst and aging steps, but to the ease of its application to any of a variety of metal and metalized surfaces and the dependably uniform properties of the cured coating.

As previously indicated, the cured coating composition of the invention exhibits outstanding properties including a high level of adhesion to its metal substrate, corrosion resistance, flexibility (resistance to cracking and crazing), abrasion/wear resistance and optical clarity, the latter being a particularly sought-after property where the cured coating composition is to additionally function as a decorative coating.

EXAMPLES

Comparative Example 1

Comparative Example 1 illustrates a curable coating forming composition prepared in accordance with Burger et al. U.S. Pat. No. 6,695,904 and applied to an anodized aluminum panel of 15 cm length, 4 cm width and 4 mm thickness.

A mixture of methyltrimethoxysilane, 62.0 g, tetraethoxysilane, 18.1 g, and aqueous colloidal silica, 23.13 g (40 wt % suspension) was prepared to which was added dropwise at −5° C. 1.3 gm of 37 weight percent sulfuric acid as acid hydrolysis catalyst. The mixture was continuously stirred at 20° C. for one hour to provide a coating composition. Within a few hours, the reaction mixture had gelled. However, after 1 hour, an attempt was made to flow coat the mixture onto an anodized aluminium substrate at 23° C. temperature and 40% RH to a uniform thickness of about 10-15 microns. After flow coating volatiles were allowed to evaporate over a 25 minute flush-off time, the coating was cured at 130° C. for 1 hour.

The resulting cured coating was opaque, exhibited widespread cracking and had delaminated indicating little if any adhesion to the underlying anodized aluminum surface.

A sample of the coating composition aged at 50° C. for 24 hours had completely gelled and a sample of the coating composition held at about 23° C. had completely gelled within 24 to 48 hours. Due to its instability, the viscosity of the coating composition could not be measured.

Examples 1-15 (Using Colloidal Silica as Metal Oxide (ii))

Examples 1-15 illustrate the preparation of coating forming compositions of the invention and their performance as cured coatings on anodized aluminum panels of 15 cm length, 4 cm width and 4 mm thickness and on stainless steel panels of 15 cm length, 10 cm width and 1 mm thickness.

The starting components of the curable coating forming compositions of Examples 1-15 are listed in Table 1 below:

TABLE 1

| Starting Materials | | |
|---|---|---|
| Component | | Chemical Name |
| Trialkoxysilane | 1a | methyltrimethoxy silane |
| | 1b | glycidoxypropyltrimethoxy silane |
| | 1c | oligomeric glycidoxypropyl-trimethoxysilane |
| | 1d | bis(triethoxysilylpropyl)tetrasulfide |
| | 1e | trifluoropropyltrimethoxysilane |
| | 1f | bis(triethoxysilylpropyl)disulfide |
| optional tetraethoxysilane | 2 | tetraethoxysilane (i.e., tetraethylorthosilicate) |
| Catalyst | 3a | acetic acid hydrolysis catalyst |
| | 3b | tetrabutyl ammonium acetate (TBBA) condensation catalyst |
| metal oxide | 4a | aqueous colloidal silica, 40 weight percent solids |
| deionized water | 5 | deionized water |
| solvent | 6 | 2-propanol |
| | 7 | n-butanol |
| silicone surface additive | 8 | BYK-302 flow additive (1% in methoxypropanol) |

The general procedure used for forming the curable coating forming compositions of Examples 1-15 is described below in Table 2:

TABLE 2

| Preparative Procedure | |
|---|---|
| Step | Description |
| 1 | A glass container was charged with part of the acetic acid hydrolysis catalyst and all of the trialkoxysilane(s). |
| 2 | After chilling the mixture from Step 1 in an ice bath at 0° C., a mixture of aqueous colloidal silica and water were dropwise added thereto while maintaining the temperature below 10° C. The mixture was then stirred for approximately 16 hours during which the temperature of the mixture rose to room temperature. |

TABLE 2-continued

Preparative Procedure

| Step | Description |
|---|---|
| 3 | The alcohols and remaining acetic acid hydrolysis catalyst were then added and the mixture stirred for approximately 12 hours following the addition of TBAA condensation catalyst and flow additive. |
| 4 | The mixture from Step 3 was aged for approximately 6 days at 50° C. in a hot air oven. The viscosity of each curable coating composition was measured and determined to come within the range of from about 3.0 to about 7.0 cStks. |

Employing the starting materials listed in Table 1 and the general preparative procedure described in Table 2, the curable coating forming compositions of Examples 1-15 were prepared from the indicated mixtures set forth in Table 3 below:

TABLE 3

Curable Coating Forming Compositions

| Example | Component (from Table 1) | Weight Percent |
|---|---|---|
| Example 1 | 1a | 35.44 |
|  | 3a | 2.73 |
|  | 3b | 0.104 |
|  | 4a | 14.6 |
|  | 5 | 12.6 |
|  | 6 | 16.63 |
|  | 7 | 16.42 |
|  | 8 | 1.82 |
| Example 2 | 1a | 33.77 |
|  | 2 | 1.69 |
|  | 3a | 2.73 |
|  | 3b | 0.105 |
|  | 4a | 14.27 |
|  | 5 | 12.62 |
|  | 6 | 16.63 |
|  | 7 | 16.42 |
|  | 8 | 1.82 |
| Example 3 | 1a | 32.22 |
|  | 2 | 3.23 |
|  | 3a | 2.73 |
|  | 3b | 0.104 |
|  | 4a | 14.26 |
|  | 5 | 12.71 |
|  | 6 | 16.63 |
|  | 7 | 16.42 |
|  | 8 | 1.82 |
| Example 4 | 1a | 30.82 |
|  | 2 | 4.62 |
|  | 3a | 2.73 |
|  | 3b | 0.104 |
|  | 4a | 14.27 |
|  | 5 | 12.6 |
|  | 6 | 16.63 |
|  | 7 | 16.42 |
|  | 8 | 0.104 |
| Example 5 | 1a | 29.53 |
|  | 2 | 5.91 |
|  | 3a | 2.73 |
|  | 3b | 0.104 |
|  | 4a | 14.26 |
|  | 5 | 12.6 |
|  | 6 | 16.63 |
|  | 7 | 16.42 |
|  | 8 | 0.104 |
| Example 6 | 1a | 33.75 |
|  | 1d | 1.69 |
|  | 3a | 2.74 |
|  | 3b | 0.104 |
|  | 4a | 14.26 |
|  | 5 | 12.61 |
|  | 6 | 16.63 |
|  | 7 | 16.43 |
|  | 8 | 1.82 |
| Example 7 | 1a | 32.24 |
|  | 1d | 3.22 |
|  | 3a | 2.73 |
|  | 3b | 0.105 |
|  | 4a | 14.26 |
|  | 5 | 12.6 |
|  | 6 | 16.64 |
|  | 7 | 16.42 |
|  | 8 | 1.82 |
| Example 8 | 1a | 29.53 |
|  | 1d | 5.91 |
|  | 3a | 2.73 |
|  | 3b | 0.104 |
|  | 4a | 14.26 |
|  | 5 | 12.6 |
|  | 6 | 16.63 |
|  | 7 | 16.42 |
|  | 8 | 1..82 |
| Example 9 | 1a | 33.75 |
|  | 1f | 1.69 |
|  | 3a | 2.73 |
|  | 3b | 0.105 |
|  | 4a | 14.29 |
|  | 5 | 12.6 |
|  | 6 | 16.63 |
|  | 7 | 16.42 |
|  | 8 | 1.82 |
| Example 10 | 1a | 32.22 |
|  | 1f | 3.22 |
|  | 3a | 2.73 |
|  | 3b | 0.104 |
|  | 4a | 14.26 |
|  | 5 | 12.61 |
|  | 6 | 16.63 |
|  | 7 | 16.42 |
|  | 8 | 1.82 |
| Example 11 | 1a | 29.53 |
|  | 1f | 5.91 |
|  | 3a | 2.73 |
|  | 3b | 0.104 |
|  | 4a | 14.26 |
|  | 5 | 12.6 |
|  | 6 | 16.63 |
|  | 7 | 16.42 |
|  | 8 | 1.82 |
| Example 12 | 1a | 33.79 |
|  | 1e | 1.7 |
|  | 3a | 2.74 |
|  | 3b | 0.105 |
|  | 4a | 14.28 |
|  | 5 | 12.63 |
|  | 6 | 16.64 |
|  | 7 | 16.4 |
|  | 8 | 1.82 |
| Example 13 | 1a | 32.27 |
|  | 1e | 3.24 |
|  | 3a | 2.77 |
|  | 3b | 0.105 |
|  | 4a | 14.29 |
|  | 5 | 12.63 |

TABLE 3-continued

Curable Coating Forming Compositions

| Example | Component (from Table 1) | Weight Percent |
|---|---|---|
|  | 6 | 16.65 |
|  | 7 | 16.43 |
|  | 8 | 1.82 |
| Example 14 | 1a | 33.41 |
|  | 1b | 1.67 |
|  | 3a | 2.7 |
|  | 3b | 0.103 |
|  | 4a | 14.11 |
|  | 5 | 12.47 |
|  | 6 | 16..46 |
|  | 7 | 16.25 |
|  | 8 | 1.8 |
|  | 9 | 2.81 |
| Example 15 | 1a | 33.75 |
|  | 1c | 1.69 |
|  | 3a | 2.73 |
|  | 3b | 0.104 |
|  | 4a | 14.26 |
|  | 5 | 12.6 |
|  | 6 | 16.63 |
|  | 7 | 16.42 |
|  | 8 | 1.82 |

The viscosities of the coating forming compositions of Example 1, 3 and 15, set forth in Table 4 below, were measured in accordance with the DIN 53015 standard, "Viscometry—Measurement of Viscosity by Means of the Rolling Ball Viscometer by Hoeppler" at 25° C. employing a Hoeppler Falling Ball Viscometer Model 356-001 equipped with a Haake DC10 temperature control unit and ball set 800-0182, in particular, ball no. 2 having a diameter of 15.598 mm, a weight of 4.4282 g and a density of 2.229 g/cm$^3$.

TABLE 4

Viscosities of Curable Coating Forming Compositions

| Example | Viscosity, cStks |
|---|---|
| 1 | 4.9936 |
| 3 | 4.8850 |
| 15 | 4.8678 |

The general procedures for applying the curable coating forming compositions of Examples 1-15 to the anodized aluminum and stainless steel panels and curing the coatings thereon were as follows:

Coating Procedure

Application of a coating layer having an approximate thickness of 10 microns may be carried out by any suitable means, e.g., by dip, flow or spray coating. Dip coating was used for applying an approximately 10 micron thick layer of coating forming composition to the anodized aluminium panels while flow coating was used for applying a coating of this thickness to the stainless steel panels.

Curing Procedure

After applying coatings to the anodized aluminum and stainless steel substrates, volatiles were evaporated at about 23° C. resulting in the formation of tack-free coating layers within about 25 minutes. The coated panels were then baked in a hot air oven at 130° C. for 45-60 minutes to produce a completely cured, clear hard coat on the metal surfaces.

Testing of the coated metal panels was carried out as described below in Table 5:

TABLE 5

Testing of Coated Panels

| Test | Procedure |
|---|---|
| Appearance of a Panel | Appearance of the panels was by visual inspection. To pass the appearance test, a coating had to be smooth, glossy, optically clear and free of other visible defects. |
| Adhesion of Coating to Panel | The adhesion test was carried out in accordance with ASTM D 3359 (5B considered as best adhesion, 0B considered as no adhesion) |
| Scratch/Abrasion Resistance of Coating | The scratch/abrasion resistance test was carried out using grade 0000 steel wool taped to a 1 × 1 inch end of a bar weighing 1 kg. The steel wool side was rubbed back and forth 10 times on the coating followed by visual inspection of the coating for scratches. A coated panel was considered to pass this test if there were no visual scratches. |
| Heat Resistance | The coated panels were maintained in a hot air oven at 160° C. for 24 hours. To pass this test, there could no observable adhesion loss, delamination or cracking. |
| Acid Alkali Resistance | The coated panels were dipped into a pH 1.0 HCl/pH 13.5 phosphate buffer solution for 10 minutes. The panels were then removed from the buffer solution, washed with DI water and dried at ambient temperature (approximately 23° C.). To pass this test, there could be no softening of the coating film, adhesion loss, delamination, cracking or corrosion. |
| Humidity Resistance | This test was carried out per DIN EN ISO 6270-2-CH. To be acceptable, the coating had to pass 240 hours according to this test. |
| Copper Accelerated Salt Spray Resistance (CASS) Test | This test was carried out per DIN EN ISO 9227. To be acceptable, the coating had to pass 48 hours according to this test. |
| Neutral Salt Spray Resistance (NSS) Test | This test was carried out per DIN EN ISO 9227. To be acceptable, a coating had to pass 480 hours according to this test. |

Coating performance data are presented in Tables 6-9 as follows:

TABLE 6

Coating Performance on Anodized Aluminum Substrates

| Example | Coating Appearance | Initial Adhesion | Steel Wool Abrasion | Heat Resistance | Acid resistance | Alkaline resistance |
|---|---|---|---|---|---|---|
| 1 | Clear/Smooth/Glossy | Passed 5B | Passed | Passed | Passed | Passed |
| 2 | Clear/Smooth/Glossy | Passed 5B | Passed | Passed | Passed | Passed |
| 3 | Clear/Smooth/Glossy | Passed 5B | Passed | Passed | Passed | Passed |
| 4 | Clear/Smooth/Glossy | Passed 5B | Passed | Passed | Passed | Passed |
| 5 | Clear/Smooth/Glossy | Passed 5B | Passed | Passed | Passed | Passed |
| 6 | Clear/Smooth/Glossy | Passed 5B | Passed | Passed | Passed | Passed |
| 7 | Clear/Smooth/Glossy | Passed 5B | Passed | Passed | Passed | Passed |
| 8 | Clear/Smooth/Glossy | Passed 5B | Passed | Passed | Passed | Passed |
| 9 | Clear/Smooth/Glossy | Passed 5B | Passed | Passed | Passed | Passed |
| 10 | Clear/Smooth/Glossy | Passed 5B | Passed | Passed | Passed | Passed |
| 11 | Clear/Smooth/Glossy | Passed 5B | Passed | Passed | Passed | Passed |
| 12 | Clear/Smooth/Glossy | Passed 5B | Passed | Passed | Passed | Passed |
| 13 | Clear/Smooth/Glossy | Passed 5B | Passed | Passed | Passed | Passed |
| 14 | Clear/Smooth/Glossy | Passed 5B | Passed | Passed | Passed | Passed |
| 15 | Clear/Smooth/Glossy | Passed 5B | Passed | Passed | Passed | Passed |

TABLE 7

Coating Performance on Unpolished Bulk Aluminum Substrate

| Example | Coating Appearance | Initial Adhesion | Steel Wool Abrasion | Heat Resistance |
|---|---|---|---|---|
| 1 | Clear/Smooth/Glossy | Passed 5B | Passed | Passed |
| 10 | Clear/Smooth/Glossy | Passed 5B | Passed | Passed |

TABLE 8

Coating Performance on Stainless Steel Substrate

| Example | Coating Appearance | Initial Adhesion | Steel Wool Abrasion | Heat Resistance |
|---|---|---|---|---|
| 1 | Clear/Smooth/Glossy | Passed 5B | Passed | Passed |

TABLE 9

Corrosion Performance on Anodized Aluminum Substrate

| Example | Humidity Resistance, 240 hr | NSS Resistance, 480 hr | CASS Test, 48 hr |
|---|---|---|---|
| 1 | Passed | Passed | Passed |

Examples 16 to 25 (Using a Mixture of Silica and Alumina Particles as the Metal Oxide (ii))

TABLE-10

Starting materials

| | | Chemical name | Commerical name/Source | Ranges (wt-% in formulation) |
|---|---|---|---|---|
| Trialkoxysilane | 1a | methyltrimethoxy silane (MTMS) | A-163 | 35 |
| Catalyst | 3a | acetic acid hydrolysis catalyst | Aldrich | 3 |
| | 3b | tetrabutyl ammonium acetate (TBBA) condensation catalyst | TBAA | 0.10 |
| metal oxide | 4a | $SiO_2$ (silica) dispersion | Ludoxa ® S40 | 3-14 |
| | 4b | $Al_2O_3$ (alumina) dispersion | Aldrich | 1-22 |
| deionized water | 5 | DI water | | 13-19 |
| Solvents | 6 | 2-propanol | Aldrich | 0-16 |
| | 7 | n-butanol | Aldrich | 15-17 |
| Additives | 8 | BYK-302 flow additive (1% in methoxypropanol) | BYK-302 | 2 |

TABLE 11

Examples 16-25
(all figures relate to wt-% based on the total composition)

| Examples | Ex-16 | Ex-17 | Ex-18 | Ex-19 | Ex-20 | Ex-21 | Ex-22 | Ex-23 | Ex-24 | Ex-25 |
|---|---|---|---|---|---|---|---|---|---|---|
| Acetic Acid | 0.84 | 0.85 | 0.85 | 0.84 | 0.85 | 0.85 | 0.84 | 0.85 | 0.85 | 0.84 |
| MTMS | 35.08 | 35.10 | 35.09 | 35.08 | 35.09 | 35.12 | 35.08 | 35.08 | 35.07 | 35.08 |
| Colloidal $Al_2O_3$ | 1.42 | 2.27 | 2.56 | 2.82 | 3.12 | 3.42 | 4.24 | 7.13 | 14.26 | 21.40 |
| Colloidal $SiO_2$ | 13.41 | 12.99 | 12.87 | 12.70 | 12.57 | 12.47 | 12.01 | 10.70 | 7.13 | 3.57 |
| DI Water | 13.02 | 13.29 | 13.40 | 13.45 | 13.58 | 13.65 | 13.86 | 14.74 | 16.09 | 19.02 |
| Iso-propanol | 15.62 | 14.85 | 14.62 | 14.37 | 14.17 | 13.97 | 13.26 | 10.82 | 5.12 | 0.00 |
| n-Butanol | 16.43 | 16.44 | 16.42 | 16.42 | 16.47 | 16.47 | 16.42 | 16.53 | 16.53 | 15.94 |

TABLE 11-continued

Examples 16-25
(all figures relate to wt-% based on the total composition)

| Examples | Ex-16 | Ex-17 | Ex-18 | Ex-19 | Ex-20 | Ex-21 | Ex-22 | Ex-23 | Ex-24 | Ex-25 |
|---|---|---|---|---|---|---|---|---|---|---|
| Acetic Acid | 1.89 | 1.90 | 1.89 | 1.89 | 1.89 | 1.89 | 1.90 | 1.89 | 1.89 | 1.89 |
| BYK 302 (1% in MP) | 1.82 | 1.82 | 1.82 | 1.82 | 1.82 | 1.82 | 1.82 | 1.82 | 1.82 | 1.82 |
| TBAA | 0.104 | 0.104 | 0.104 | 0.104 | 0.104 | 0.104 | 0.104 | 0.105 | 0.104 | 0.105 |

The Coating Formulations were Prepared by Either of the Following Procedure:

One-Pot Procedure for Coating Formulations:

A glass bottle was charged with acetic acid and trialkoxy silane. After cooling down the reaction mixture in an ice bath to 0° C., mixture of silica nanoparticles and water were drop wise added to the chilled mixture of silanes and acetic acid while maintaining temperature below 10° C. The mixture was then allowed to stir for approx. 1-2 hours. Alumina nano-particle dispersion was then added to the mixture, and allowed to stir for another approx. 12-14 hours while the solution temperature slowly increased to room temperature. Then, alcohols and remaining acetic acid were added and stirred for approximately 12 hours following which TBAA catalyst and flow additive were added. After this, the formulations were aged approx. for 5 days at 50° C. in hot air oven prior to coating on metal surface.

Two-Pot Procedure for Coating Formulations:

In this method, the coating solutions can be prepared by reacting alkoxy silane with different nanoparticles separately. This method may be a better choice over one-pot procedure for the compositions where there is a tendency of nanoparticles to settle down in the formulation. However, this method can in general be used for coating compositions having any ratios of two different nanoparticles. In this method, a glass bottle was charged with acetic acid and trialkoxy silane. After cooling down the reaction mixture in an ice bath to 0° C., mixture of silica nanoparticles and water were drop wise added to the chilled mixture of silanes and acetic acid while maintaining temperature below 10° C. The mixture was then allowed to stir for approx. 16 hours while the solution temperature slowly rose to room temperature. In another glass bottle, a portion of alkoxy silane (preferably 1:1 weight percentage of silane and nanoparticle) and nanoparticle (alumina) were mixed together, and kept for stirring approx. 16 h at room temperature. After this, both the solutions were mixed together at room temperature and kept for stirring for 1-2 hours. Then, alcohols and remaining acetic acid were added and stirred for approximately 12 hours following which TBAA catalyst and flow additive were added. After this, the formulations were aged approx. for 5 days at 50° C. in hot air oven prior to coating on metal surface.

General Procedure for Coating on Metal Surfaces:

The coating composition is a thermal cure single layer optically clear protective coating which was directly applied on anodized aluminium surfaces. Application of thin layer coating of approximate thickness around 10 microns was achieved by dip/flow/spray coating. After coating on aluminium substrates, volatiles evaporate at ambient condition (approx. 20-25° C., 40±10% RH) and a tack free coating layer is formed within 25-30 minutes. After solvent flush off the coated panels were baked in hot air oven between 130-200° C. for 30-60 minutes to obtain completely cured, clear hard coat on metal surface.

Test Methods (Examples 16-25):

Coating appearance: This test is done by visual inspection. To pass, the coating shall be smooth, glossy, optically clear, and free from any coating defects.

Initial Adhesion: Cross hatch adhesion test is done following as per the standard procedure ASTM D 3359. To be acceptable all coating must pass 5B.

Crockmeter Abrasion Resistance Test: This test is done by AATCC Crockmeter CM-5 instrument using green crocking cloths 5 cm×5 cm (from Atlas) for 10 cycles (1 cycle=rubbing forth and back); distance: 100 mm; force: 9 N (automatically applied). To pass this test, there should not be any visible scratches on the surface after the test.

Heat Resistance: The coated panels are kept in a hot air oven at 160° C. for 24 h. To pass, there should not be adhesion loss, delamination or cracking.

Hydrochloric acid resistance test: The coated panels are dipped into a pH 1.0 Hydrochloric (HCl) acid solution for 10 minutes. After exposure, panels are taken out from solution, washed with DI water and dried in ambient condition. To pass, there should not be softening of the coating film, adhesion loss, delamination, cracking or corrosion.

Alkaline resistance test: The coated panels are dipped into a pH 13.5 sodium hydroxide buffer solution for 10 minutes. The buffer solution is prepared by mixing appropriate weight of sodium hydroxide, sodium phosphate dodecahydrate, sodium chloride and Deionized water. After exposure, panels are taken out from solution, washed with DI water and dried in ambient condition. To pass, there should not be softening of the coating film, adhesion loss, delamination, cracking or corrosion.

Sulfuric acid resistance test: The coated panels are dipped into a pH 2.1 $H_2SO_4$ solution for 5 days. After exposure, panels are taken out from solution, washed with DI water and dried in ambient condition. To pass, there should not be softening of the coating film, adhesion loss, delamination, cracking or corrosion.

Corrosion resistance test-Kesternich test (Acid rain simulation): This test is done as per DIN 50017 up to 3 cycle. To pass this test, coating shall not exhibit any softening, delamination, loss of adhesion, changes in visual appearance or any other coating defects.

TABLE 12

Test results examples 16-25

| Example | Appearance | Adhesion | Crock-meter Test | Heat Resistance | Acid Resistance pH 1.0 HCl | Acid Resistance pH 3.5 $H_2SO_4$ | Alkaline Resistance pH 13.5 NaOH buffer |
|---|---|---|---|---|---|---|---|
| 16 | Clear, No defects | 5B | Passes | Passes | Passes | Passes | Passes |
| 17 | Clear, No defects | 5B | Passes | Passes | Passes | Passes | Passes |
| 18 | Clear, No defects | 5B | Passes | Passes | Passes | Passes | Passes |
| 19 | Clear, No defects | 5B | Passes | Passes | Passes | Passes | Passes |
| 20 | Clear, No defects | 5B | Passes | Passes | Passes | Passes | Passes |
| 21 | Clear, No defects | 5B | Passes | Passes | Passes | Passes | Passes |
| 22 | Clear, No defects | 5B | Passes | Passes | Passes | Passes | Passes |
| 23 | Clear, No defects | 5B | Few scratches | Passes | Passes | Passes | Passes |
| 24 | Clear, No defects | 5B | Few scratches | Passes | Passes | Passes | Passes |
| 25 | Clear, No defects | 5B | Few scratches | Passes | Passes | Passes | Passes |

Corrosion Resistance Test: Kesternich Test (Acid Rain Simulation)

Examples 19, 23, 24 and 25 were subjected to Kesternich test and all passed the test.

As evidenced by these tests the inventive compositions of examples 16-25, comprising silica and alumina particles, all provide good coating properties such as adhesion, abrasion and pH resistance tests (HCl and NaOH buffer solution). In particular the examples also provide very good results regarding scratch resistance, pH resistance test including sulfuric acid resistance and in the Kesternich tests.

Examples 26 to 30 ($Al_2O_3$—$SiO_2$—Core-Shell Particles as the Metal Oxide (ii))

TABLE 13

Starting Materials

| Component | | Chemical Name |
|---|---|---|
| Trialkoxysilane | 1a | methyltrimethoxy silane |
| | 1b | glycidoxypropyltrimethoxy silane |
| Catalyst | 3a | acetic acid hydrolysis catalyst |
| | 3b | tetrabutyl ammonium acetate (TBBA) condensation catalyst |
| metal oxide | 4c | Levasil 100S/45 45 weight percent solids |
| metal oxide | 4d | Levasil 200S/30 30 weight percent solids |
| deionized water | 5 | deionized water |
| solvent | 6 | isopropanol |
| | 7 | n-butanol |
| silicone surface additive | 8 | BYK-302 flow additive (1% in methoxypropanol) |

TABLE-14

Examples 26-30 (all figures relate to wt-% based on the total composition)

| | Ex 26 | Ex 27 | Ex 28 | Ex 29 | Ex 30 |
|---|---|---|---|---|---|
| MTMS | 37.04 | 34.59 | 33.90 | 26.87 | 19.96 |
| Glycidoxypropyl-trimethoxy silane | 0.00 | 3.84 | 3.77 | 13.44 | 10.01 |
| Levasil ® 100S/45 | 7.06 | 7.33 | 3.60 | 4.47 | 3.32 |
| Levasil ® 200S/30 | 9.26 | 9.60 | 4.73 | 14.90 | 12.03 |
| Water | 13.23 | 13.83 | 13.56 | 0.00 | 0.00 |
| n-Butanol | 15.18 | 15.74 | 15.92 | 24.43 | 26.87 |
| Isopropanol | 15.18 | 15.74 | 15.92 | 24.43 | 26.87 |
| Acetic Acid | 2.85 | 2.95 | 2.89 | 3.42 | 0.77 |
| BYK302 | 0.10 | 0.10 | 0.10 | 0.05 | 0.06 |
| TBAA | 0.10 | 0.10 | 0.10 | 0.13 | 0.12 |

Preparation of the Coating Compositions

The mixture of core-shell particles Levasil 100S/45 and Levasil 200S/30 and acetic acid are stirred in a flask. The mixture is cooled to 0-10° C. while the silanes are dropwise added within 20-50 min. The mixture is stirred while the solution is allowed to come to room temperature. On the next day, the alcohols, the catalyst and the flow additive are added. The whole mixture is stirred for at least 15 min.

Coating Procedure

After preparation, the clear coating compositions were directly applied onto anodized aluminum with a layer thickness of 2 µm to 8 µm. Application of the coating compositions was achieved by dip/flow or spray coating. After coating anodized aluminum substrates, solvent flush off takes 2-20 min. to obtain a tack free coating layer. Coated substrates are then cured in a hot air oven at 130° C. to 200° C. for 30 min. to 2 hours to obtain complete curing.

Table 15: Test Results Examples 26-30

The following tests and test procedures have been performed on anodized aluminum parts.

$SO_2$ lab test transferred from DIN50018-2.0S: 0.67 wt. % $SO_2$ solution in a 5 L bottle that is placed into a water bath at 40° C. The coated samples are placed with the bottom part into this solution, whereas the upper part experiences the $SO_2$ atmosphere. According to the test specification, the coating should not change optically after five days.

Alkaline resistance according to TL182: No change in appearance after the following test series on the same component in a temperature range of 23° C. to 35° C.:
a) 10 double rubs with 1 kg load
b) 10 min. immersion in pH 1 solution (0.1 molar hydrochloric acid)
c) Rinsing in water and drying
d) Aging at 40° C. for 1 h, then continue the test sequence without cooling down
e) 10 min. immersion in pH 13.5 solution (12.7 g caustic soda, 4.64 g sodium phosphate dodecahydrate, 0.33 g sodium chloride; all dissolved in 1 liter water)

48 h salt spray test as per DIN EN ISO 9227 (CASS test).

The following table summarizes the results from the different coating compositions:

TABLE 15

| Example | SO$_2$ Lab test | Kesternich Test | Alkaline resistance | CASS test |
|---|---|---|---|---|
| 26 | ok | ok | ok | Ok |
| 27 | ok | — | — | — |
| 28 | ok | — | — | — |
| 29 | ok | ok | ok | ok |
| 30 | ok | ok | ok | ok |

While the invention has been described above with references to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims.

The invention claimed is:

1. A metal substrate coated with a coating, the coating formed from a coating forming composition comprising:
(i) at least one alkoxysilane selected from the group consisting of Formula A:

or hydrolyzed and condensed products thereof,
wherein:
X is an organofunctional group;
each $R^1$ is a linear, branched or cyclic divalent organic group of from 1 to about 12 carbon atoms optionally containing one or more heteroatoms;
each $R^2$ independently is an alkyl, aryl, alkaryl or aralkyl group of from 1 to about 16 carbon atoms, optionally containing one or more halogen atoms;
each $R^3$ independently is an alkyl group of from 1 to about 12 carbon atoms;
subscript a is 0 or 1, subscript b is 0, 1 or 2 and a+b is 1 or 2; and,
the amount of alkoxysilane of Formula A when subscript a is 0 or 1, subscript b is 0, 1 or 2 and a+b is 2 is from 0 to about 25 weight percent of the coating forming composition,
the amount of alkoxysilane of Formula A in which subscript a is 0 or 1, subscript b is 0 or 1 and a+b is 1 is from about 8 to about 40 weight percent of the coating forming composition, and
wherein the total amount of alkoxysilane of Formula A does not exceed about 50 weight percent of the coating forming composition;
(ii) at least one metal oxide in particulate form, the amount of metal oxide being from about 5 to about 50 weight percent of the coating forming composition;
(iii) at least one water miscible organic solvent;
(iv) at least one acid hydrolysis catalyst;
(v) water; and,
(vi) optionally, at least one condensation catalyst,
the coating forming composition having a viscosity within the range of from about 3.0 to about 7.0 cStks at 25° C.

2. The coated substrate of claim 1, wherein the total amount of alkoxysilane of Formula A does not exceed about 45 weight percent of the coating forming composition.

3. The coated substrate of claim 1, wherein the total amount of alkoxysilane of Formula A does not exceed about 40 weight percent of the coating forming composition.

4. The coated substrate according to claim 1, wherein in the alkoxysilane of Formula A, a is 1 and organofunctional group X is a mercapto, acyloxy, glycidoxy, epoxy, epoxycyclohexyl, epoxycyclohexylethyl, hydroxy, episulfide, acrylate, methacrylate, ureido, thioureido, vinyl, allyl, —NHCOOR$^4$ or —NHCOSR$^4$ group in which R$^4$ is a monovalent hydrocarbyl group containing from 1 to about 12 carbon atoms, thiocarbamate, dithiocarbamate, ether, thioether, disulfide, trisulfide, tetrasulfide, pentasulfide, hexasulfide, polysulfide, xanthate, trithiocarbonate, dithiocarbonate, or isocyanurato group, or another —Si(OR$^3$) group wherein R$^3$ is as previously defined.

5. The coated substrate according to claim 1, wherein the at least one alkoxysilane (i) is selected from at least one member of the group consisting of trialkoxysilane of Formula A wherein subscript a is 0 or 1, subscript b is 0 or 1 and a+b is 1.

6. The coated substrate according to claim 1, comprising an alkoxysilane (i) selected from at least one member of the group consisting of dialkoxysilane of Formula A wherein subscript a is 0 or 1, subscript b is 0, 1 or 2 and a+b is 1.

7. The coated substrate according to claim 1, wherein the alkoxysilane of Formula A is a trialkoxysilane selected from the group consisting of methyltrimethoxysilane, methyltriethoxysilane, ethyltrimethoxysilane, ethyltriethoxysilane, ethyltripropoxysilane, n-propyltrimethoxysilane, n-propyltriethoxysilane, n-propyltripropoxysilane, n-propyltributoxysilane, n-butyltrimethoxysilane, isobutyltrimethoxysilane, n-pentyltrimethoxysilane, n-hexyltrimethoxysilane, isoocyltriethoxysilane, vinyltrimethoxysilane, vinyltriethoxysilane, phenyltrimethoxysilane, phenyltriethoxysilane, octyltrimethoxysilane, trifluoropropyltrimethoxysilane, 3-aminopropyltrimethoxysilane, 3-mercaptopropyltrimethoxysilane, 3- mercaptopropyltriethoxy silane, 3-glycidoxypropyltrimethoxysilane and 3-glycidoxypropyltriethoxy silane.

8. The coated substrate according to claim 1, wherein the metal oxide (ii) is a colloidal suspension of at least one metal oxide selected from the group consisting of silica, alumina, titania, ceria, tin oxide, zirconia, antimony oxide, indium oxide, iron oxide, titania doped with iron oxide and/or zirconia, and rare earth oxide.

9. The coated substrate according to claim 1, wherein the metal oxide (ii) comprises a mixture of alumina and silica.

10. The coated substrate according to claim 1, wherein the metal oxide (ii) comprises a mixture of alumina and silica, wherein the said mixture has a weight ratio of alumina to silica (Al$_2$O$_3$/SiO$_2$) from 1 5:95 to 90:10.

11. The coated substrate according to claim 1, wherein the metal oxide (ii) comprises silica modified with alumina.

12. The coated substrate according to claim 1, wherein the water-miscible solvent (iii) is at least one member selected from the group consisting of mono-alcohols, glycol, glycol ether and ketone.

13. The coated substrate according to claims 1, wherein the at least one acid hydrolysis catalyst (iv) is at least one member selected from the group consisting of sulfuric acid, hydrochloric acid, acetic acid, propanoic acid, 2-methyl propanoic acid, butanoic acid, pentanoic acid (valeric acid), hexanoic acid (caproic acid), 2-ethylhexanoic acid, heptanoic acid (enanthic acid), octanoic acid (caprylic acid), oleic acid, linoleic acid, , cyclohexanecarboxylic acid, cyclohexylacetic acid, cyclohexenecarboxylic acid, benzoic acid, benzeneacetic acid, propanedioic acid (malonic acid), butanedioic acid (succinic acid), hexanedioic acid (adipic acid), 2-butenedioic acid (maleic acid), lauric acid, stearic acid, myristic acid, palmitic acid, isoanoic acid, versatic acid, and aminoacid, and wherein the coating forming composition also contains at least one condensation catalyst (vi) selected from the group consisting of tetrabutylammonium carboxylates of the formula $[(C_4H_9)_4N]^+[OC(O)—R^5]^-$ which $R^5$ is selected from the group consisting of hydrogen, alkyl groups containing from 1 to about 8 carbon atoms, and aromatic groups containing about 6 to about 20 carbon atoms.

14. The coated substrate according to claim 1, wherein condensation catalyst (vi) is at least one member selected from the group consisting of tetra-n-butylammonium acetate, tetra-n-butylammonium formate, tetra-n-butylammonium benzoate, tetra-n-butylammonium-2-ethylhexanoate, tetra-n-butylammonium-p-ethylbenzoate, tetra-n-butylammonium propionate and TBD-acetate (1,5,7-triazabicyclo[4.4.0]dec-5-ene (TBD)).

15. The coated substrate according to claim 1, having a viscosity within the range of from about 4.0 to about 5.5 cStks at 25° C.

16. The coated substrate according to claim 1, wherein the coating forming composition is obtained by the process comprising:
a) chilling a mixture of alkoxysilane (i) and acid hydrolysis catalyst (iv);
b) adding metal oxide (ii) and water (vi) to the chilled mixture of step (a);
c) adding water-miscible solvent (iii) and additional acid hydrolysis catalyst (iv) to the mixture resulting from step (b);
d) aging the mixture resulting from step (c) under conditions of a temperature of 25 to 100° C. for a period of time of 30 minutes to 10 days_and providing a curable coating forming composition having a viscosity within the range of from about 3.0 to about 7.0 cStks at 25° C.; and,
e) optionally adding condensation catalyst (vi) at, during or following any of the preceding steps.

17. The coated substrate according to claim 16, wherein the metal oxide (ii) is a colloidal suspension of at least one metal oxide selected from the group consisting of silica, alumina, titania, ceria, tin oxide, zirconia, antimony oxide, indium oxide, iron oxide, titania doped with iron oxide and/or zirconia, and rare earth oxide.

18. The coated substrate according to claim 1, wherein the coating forming composition is obtained by the process comprising:
a) chilling a mixture of the metal oxide (ii) and the acid hydrolysis catalyst (iv) to a temperature of about −10° C. to about 10° C.,
b) to the chilled mixture of step (a), adding the alkoxysilane (i) to the chilled mixture of step (b);
c) allowing the mixture obtained in step (b) to come to room temperature of about 25° C.,
d) adding the at least one water miscible organic solvent (iii), and optionally the condensation catalyst (vi) and optionally one or more other optional components (vii) to the mixture obtained in step (c) to obtain a composition having a viscosity within the range of from about 3.0 to about 7.0 cStks at 25° C.

19. The coated substrate according to claim 18, wherein the metal oxide (ii) comprises silica modified with alumina.

20. The coated substrate according to claim 16, having a viscosity of from about 4.0 to about 5.5 cStks at 25° C.

21. The coated substrate according to claim 16, wherein the alkoxysilane (i) is at least one member selected from the group consisting of trialkoxysilane of Formula A wherein subscript a is 0 or 1, subscript b is 0 or 1 and a+b is 1, and mixture of trialkoxysilanes of Formula A.

22. The coated substrate according to claim 16, wherein alkoxysilane (i) is at least one member selected from the group consisting of dialkoxysilane of Formula A wherein subscript a is 0or 1, subscript b is 0, 1 or 2 and a+b is 2.

23. The coated substrate according to claim 16, wherein the alkoxysiloxane of Formula A is a trialkoxysilane selected from the group consisting of methyltrimethoxysilane, methyltriethoxysilane, ethyltrimethoxysilane, ethyltriethoxysilane, ethyltripropoxysilane, n-propyltrimethoxysilane, n-propyltriethoxysilane, n-propyltripropoxysilane, n-propyltributoxysilane, n-butyltrimethoxysilane, isobutyltrimethoxysilane, n-pentyltrimethoxysilane, n-hexyltrimethoxysilane, isoocyltriethoxysilane, vinyltrimethoxysilane, vinyltriethoxysilane, phenyltrimethoxysilane, phenyltriethoxysilane, octyltrimethoxysilane, trifluoropropyltrimethoxysilane, 3-aminopropyltrimethoxysilane, 3-mercaptopropyltrimethoxysilane, 3- mercaptopropyltriethoxy silane, 3-glycidoxypropyltrimethoxysilane and 3-glycidoxypropyltriethoxy silane.

24. The coated substrate according to claim 16, wherein the metal oxide (ii) is an aqueous colloidal suspension of at least one metal oxide selected from the group consisting of silica, alumina, titania, ceria, tin oxide, zirconia, antimony oxide, indium oxide, iron oxide, titania doped with iron oxide and/or zirconia, and rare earth oxide, wherein the water-miscible solvent (iii) is at least one member selected from the group consisting of mono-alcohols, glycol, glycol ether and ketone, wherein the acid hydrolysis catalyst (iv) is at least one member selected from the group consisting of sulfuric acid, hydrochloric acid, acetic acid, propanoic acid, 2-methyl propanoic acid, butanoic acid, pentanoic acid (valeric acid), hexanoic acid (caproic acid), 2-ethylhexanoic acid, heptanoic acid (enanthic acid), octanoic acid (caprylic acid), oleic acid, linoleic acid, linolenic acid, cyclohexanecarboxylic acid, cyclohexylacetic acid, cyclohexenecarboxylic acid, benzoic acid, benzeneacetic acid, propanedioic acid (malonic acid), butanedioic acid (succinic acid), hexanedioic acid (adipic acid), 2-butenedioic acid (maleic acid), lauric acid, stearic acid, myristic acid, palmitic acid, isoanoic acid, versatic acid, lauric acid, stearic acid, myristic acid, palmitic acid, isoanoic acid and aminoacids, and wherein the coating forming composition also comprises the at least one condensation catalyst (vi) selected from the group consisting of tetrabutylammonium carboxylates of the formula $[(C_4H_9)_4N]^+[OC(O)—R^5]^-$ in which $R^5$ is selected from the group consisting of hydrogen, alkyl groups containing from 1 to about 8 carbon atoms, and aromatic groups containing about 6 to about 20 carbon atoms.

25. The coated substrate according to claim 18, wherein the metal oxide (ii) comprises silica modified with alumina, wherein the water-miscible solvent (iii) is at least one member selected from the group consisting of mono-alcohol, glycol, glycol ether and ketone, wherein the acid hydrolysis catalyst (iv) is at least one member selected from the group consisting of sulfuric acid, hydrochloric acid, acetic acid, propanoic acid, 2-methyl propanoic acid, butanoic acid, pentanoic acid (valeric acid), hexanoic acid (caproic acid), 2- ethylhexanoic acid, heptanoic acid (enanthic acid), octanoic acid (caprylic acid), oleic acid, linoleic acid, linolenic acid, cyclohexanecarboxylic acid, cyclohexylacetic acid, cyclohexenecarboxylic acid, benzoic acid, benzeneacetic acid, propanedioic acid (malonic acid), butanedioic acid (succinic acid), hexanedioic acid (adipic acid), 2-butenedioic acid (maleic acid), lauric acid, stearic acid, myristic acid, palmitic acid, isoanoic acid, versatic acid, lauric acid, stearic acid, myristic acid, palmitic acid, isoanoic acid and aminoacids, and wherein the coating forming composition also comprises the at least one condensation catalyst (vi) selected from the group consisting of tetrabutylammonium carboxylates of the formula $[(C_4H_9)_4N]^+[OC(O)—R^5]^-$ in which $R^5$ is selected from the group consisting of hydrogen, alkyl groups containing from 1 to about 8 carbon atoms, and aromatic groups containing about 6 to about 20 carbon atoms.

26. The coated substrate according to claim 16, wherein in step (a), the mixture is chilled to a temperature of from about –20° C. to about 15° C.

27. The coated substrate according to claim 16, wherein in step (a), the mixture contains from about 10 to about 50 weight percent of the total amount of acid hydrolysis catalyst (iv), with the balance of acid hydrolysis catalyst (iv) being added in step (c).

28. The coated substrate according to claim 16, wherein in optional step (e), the mixture resulting from step (d) is additionally aged at a temperature of from about 20° C. to about 100° C. for a period of from about 1 to about 60 days.

29. A process for coating a surface of a metal to impart corrosion resistant and/or abrasion resistant properties thereto comprising applying the coating forming composition according to claim 1 to a non-coated or pre-coated surface of a metal for which corrosion resistance and/or abrasion resistance is desired and curing the applied coating forming composition to provide a corrosion resistant and/or abrasion resistant coating thereon.

30. The process of Claim 29, wherein the coating forming composition is applied to a surface of anodized aluminum, bulk aluminum, magnesium, copper, alloys thereof, steel, bronze, a metallized surface or a metal possessing at least one protective layer.

31. A process for coating a surface of a metal to impart corrosion resistant and/or abrasion resistant properties thereto which comprises applying a coating forming composition obtained by the process according to claim 16 to a non-coated or pre-coated surface of a metal for which corrosion resistance and/or abrasion resistance is desired and curing the applied coating forming composition to provide a corrosion resistant and/or abrasion resistant coating thereon.

32. The process of claim 31, wherein the coating forming composition is applied to a surface of anodized aluminum, bulk aluminum, magnesium, copper, alloys thereof, steel, bronze, a metallized surface or a metal part possessing at least one protective layer.

33. A coated surface of a metal comprising the corrosion resistant and/or abrasion resistant coating prepared by the process of claim 29.

* * * * *